(12) United States Patent
Krishnaswamy

(10) Patent No.: US 8,279,794 B2
(45) Date of Patent: Oct. 2, 2012

(54) OPPORTUNISTIC DATA FORWARDING AND DYNAMIC RECONFIGURATION IN WIRELESS LOCAL AREA NETWORKS

(75) Inventor: Dilip Krishnaswamy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 12/237,151

(22) Filed: Sep. 24, 2008

(65) Prior Publication Data

US 2010/0074119 A1    Mar. 25, 2010

(51) Int. Cl.
*H04B 7/14* (2006.01)
(52) U.S. Cl. ........ 370/315; 370/243; 370/246; 370/492; 370/501
(58) Field of Classification Search .................. 370/241, 370/242, 243, 244, 245, 246, 310, 315, 492, 370/501; 455/7, 8, 9, 10
See application file for complete search history.

(56) References Cited

U.S. PATENT DOCUMENTS

| | | | |
|---|---|---|---|
| 7,610,882 B2 | 11/2009 | Tsutsumi et al. | |
| 7,929,445 B2 * | 4/2011 | Suh et al. | 370/235 |
| 2005/0075122 A1 * | 4/2005 | Lindoff et al. | 455/522 |
| 2005/0220032 A1 * | 10/2005 | Hu | 370/244 |
| 2006/0062191 A1 * | 3/2006 | Matsumoto | 370/338 |
| 2006/0199530 A1 * | 9/2006 | Kawasaki | 455/7 |
| 2007/0275656 A1 * | 11/2007 | Chang et al. | 455/9 |
| 2008/0045215 A1 * | 2/2008 | Chen et al. | 455/435.2 |
| 2008/0049718 A1 * | 2/2008 | Chindapol et al. | 370/351 |
| 2008/0056174 A1 * | 3/2008 | Jung et al. | 370/315 |
| 2008/0075122 A1 | 3/2008 | Fourcand | |
| 2008/0081554 A1 * | 4/2008 | Suh et al. | 455/8 |
| 2008/0250293 A1 * | 10/2008 | Taori et al. | 714/748 |
| 2009/0011702 A1 * | 1/2009 | Horiuchi et al. | 455/9 |
| 2009/0034447 A1 * | 2/2009 | Yu et al. | 370/315 |
| 2009/0227201 A1 * | 9/2009 | Imai et al. | 455/7 |

(Continued)

FOREIGN PATENT DOCUMENTS

WO    WO2006085270 A1    8/2006

OTHER PUBLICATIONS

Balakrishnan, et al: "Improving Reliable Transport and Handoff Performance in Cellular Wireless Networks," Wireless Networks, ACM, New York, NY, US, vol. 1, No. 4, Dec. 1, 1995, pp. 469-481, ISSN: 1022-0038.

(Continued)

*Primary Examiner* — Chi Pham
*Assistant Examiner* — Weibin Huang
(74) *Attorney, Agent, or Firm* — Florin C. Corie

(57) ABSTRACT

Mobile communication devices and wireless network device each can participate in, or solely provide, opportunistic data forwarding in a wireless network such as a wireless local area network or radio access network. A supporting node receives wireless communication between a transmitting node and a receiving node comprising packet data units (PDUs). The receiving node communicates to the transmitting node that one or more portions of the communication were not received, which is overheard by the supporting node. The supporting node can have sufficient over-the-air (OTA) allocation in its transmit opportunity to relay the failed portions to the receiving node. Thereby, techniques such as more robust error encoding, longer transmit allocations, etc., that would reduce the effective data throughput for OTA resources are avoided while providing an ability to more rapidly adapt to a changing channel state.

8 Claims, 9 Drawing Sheets

U.S. PATENT DOCUMENTS

2009/0296625 A1* 12/2009 Wu .............................. 370/315
2010/0099352 A1* 4/2010 Lee et al. ...................... 455/15
2010/0284364 A1* 11/2010 You et al. .................... 370/330

OTHER PUBLICATIONS

Partial International Search Report—PCT/US08/079883—International Search Authority, European Patent Office—May 7, 2010.

Yi, et al: "CORA: Collaborative Opportunistic Recovery Algorithm for Loss Controlled, Delay Bounded Ad Hoc Multicast," Computer Communications, Elsevier Science Publishers BV, Amsterdam, NL, vol. 31, No. 15, Jul. 8, 2008, pp. 3672-3682, ISSN: 0140-3664.

Zhu, et al: "Resilient Opportunistic Forwarding: Issues and Challenges," Military Communications Conference, 2007. IEEE, Piscataway, NJ, US, Oct. 29, 2007, pp. 1-7, ISBN: 978-1-4244-1512-0.

International Search Report and Written Opinion—PCT/US2008/079883, International Search Authority—European Patent Office—Mar. 2, 2011.

Junzhao Du et al., "OMR, An Opportunistic Multi-Path Reliable Routing Protocol in Wireless Sensor Networks", Parallel Processing Workshops, 2007, ICPPW 2007, International Conference on, IEEE, Piscataway, NJ, USA, Sep. 1, 2007, pp. 74-74, XP031145017, ISBN, 978-0-7695-2934-9 paragraph [3.2.forwarder.election].

Kasera S K et al., "A comparison of server-based and receiver-based local recovery approaches for scalable reliable multicast", INFOCOM '98, Seventeenth Annual Joint Conference of the IEEE Computer and Communications Societies. Proceedings, IEEE San Francisco, CA, USA Mar. 29-Apr. 2, 1998, New York, NY, USA,IEEE, US, vol. 3, pp. 988-995, XP010270376, DOI, DOI,10.1109/INFOCOM.1998.662908 ISBN, 978-0-7803-4383-2 paragraph [3.protocol.description].

Lilia Paradis et al., "A Survey of Fault Management in Wireless Sensor Networks", Journal of Network and Systems Management, Kluwer Academic Publishers-Plenum Publishers, NE, vol. 15, No. 2, Mar. 13, 2007, pp. 171-190, XP019504715, ISSN, 1573-7705, DOI, DOI,10.1007/S10922-007-9062-0 paragraph [2.2.sensor.network.monitoring] paragraph [3.fault.detection] paragraph [5.2.reliable.data.dissemination].

Mehdi Effatparvar et al., "Reliable multicast routing with local recovery approach in Ad Hoc Network", Access Networks&Workshops, 2007. ACCESSNETS '07. Second Inter National Conference on, IEEE, PI, Aug. 1, 2007, pp. 1-6, XP031212433, ISBN, 978-1-4244-1149-8 paragraph [3.reliable.multicasting.and.local.recovery].

Nohara M et al., "Mobile Multi hop Relay Networking in IEEE 802.16", IEEE 802.16 Presentation Submission Template, XX, XX, Jul. 13, 2005, pp. 1-17, XP002465370, pp. 5,8.

Zhu P et al., "802.16j (Mobile Multihop Relay) Technical Requirements", Internet Citation, Jul. 2006, XP002465373, Retrieved from the Internet, URL: http,//wirelessman.org/relay/contri b/ [retrieved on Jan. 18, 2008] requirements $CM\_4, CM\_8$, DATA_4, DATA_6, pp. 5,8.

* cited by examiner

OPPORTUNISTIC DATA FORWARDING AND DYNAMIC RECONFIGURATION IN WIRELESS LOCAL AREA NETWORKS

FIELD OF INVENTION

The following description relates generally to wireless communications, and more particularly to managing transmission and reception in a wireless communication environment.

BACKGROUND

Recent developments in a number of different digital technologies have greatly increased the need to transfer large amounts of data from one device to another or across a network to another system. Technological developments permit digitization and compression of large amounts of voice, video, imaging, and data information, which may be rapidly transmitted from computers and other digital equipment to other devices within the network. Computers have faster central processing units and substantially increased memory capabilities, which have increased the demand for devices that can more quickly transfer larger amounts of data.

Increasingly, these uses have migrated to portable devices. Wireless communication devices have become smaller and more powerful in order to meet consumer needs and to improve portability and convenience. The increase in processing power in mobile devices such as cellular telephones has led to an increase in demands on wireless network transmission systems. Thus, increasing numbers of portable devices compete for scarce over-the-air resources. Mobility, environmental obstructions, and interfering sources (e.g., transmit collisions between wireless communication devices) can make it difficult to successfully communicate with another node in a local access network or radio access network. Channel quality can rapidly fade or be impacted with a dynamically changing signal-to-noise ratio that challenges successful communication.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with performing opportunistic data forwarding and dynamic reconfiguration in a wireless communication system, such as a wireless local access network or radio access network. In situations in which a transmitting node is still within range of a receiving node, formally setting up a multi-hop ad hoc network can be unadvisable, especially if failing to receive certain data packets is due to intermittent interference. Over-the-air (OTA) resources can be better utilized if another node, referred to as a supporting node, relays those data packets that the receiving node signals as having failed without having to wait for the transmitting node to have another opportunity to retransmit. Dynamically reconfiguring a wireless local network can respond to rapidly changing channel states, optimize OTA resources, avoid degraded time-critical communication due to missed data packets, and distribute administrative overhead.

In one aspect, a method provides for opportunistic data forwarding in a wireless network. Wireless communication between a transmitting node and a receiving node comprising packet data units (PDUs) is received. A communication from the receiving node to the transmitting node is received at a supporting node indicating a failure to receive a PDU. The PDU that was indicated to have failed is transmitted to the receiving node from the supporting node.

In another aspect, at least one processor provides for opportunistic data forwarding in a wireless network. A first module receives wireless communication between a transmitting node and a receiving node comprising packet data units (PDUs). A second module receives a communication at a supporting node from the receiving node to the transmitting node indicating a failure to receive a PDU. A third module transmits the PDU that was indicated to have failed to the receiving node from the supporting node.

In an additional aspect, a computer program product provides for opportunistic data forwarding in a wireless network by comprising computer-readable storage medium having sets of codes. A first set of codes causes a computer to receive wireless communication between a transmitting node and a receiving node comprising packet data units (PDUs). A second set of codes causes the computer to receive a communication at a supporting node from the receiving node to the transmitting node indicating a failure to receive a PDU. A third set of codes causes the computer to transmit the PDU that was indicated to have failed to the receiving node from the supporting node.

In another additional aspect, an apparatus provides for opportunistic data forwarding in a wireless network. Means are provided for receiving wireless communication between a transmitting node and a receiving node comprising packet data units (PDUs). Means are provided for receiving a communication at a supporting node from the receiving node to the transmitting node indicating a failure to receive a PDU. Means are provided for transmitting the PDU that was indicated to have failed to the receiving node from the supporting node.

In a further aspect, a mobile communication devices and wireless network device each can participate in or solely provide opportunistic data forwarding in a wireless network. A receiver receives wireless communication between a transmitting node and a receiving node comprising packet data units (PDUs), and receives a communication at a supporting node from the receiving node to the transmitting node indicating a failure to receive a PDU. A transmitter transmits the PDU that was indicated to have failed to the receiving node from the supporting node.

In yet one aspect, a method provides for opportunistic data forwarding in a wireless network. Wireless communication from a transmitting node comprising packet data units (PDUs) is received. A failure to receive a PDU is determined. Communication is transmitted to the transmitting node indicating a failure to receive a PDU. The PDU is received from a supporting node responding to the communication to the transmitting node.

In yet another aspect, at least one processor provides for opportunistic data forwarding in a wireless network. A first module receives wireless communication from a transmitting node comprising packet data units (PDUs). A second module determines a failure to receive a PDU. A third module transmits a communication to the transmitting node indicating a failure to receive a PDU. A fourth module receives the PDU from a supporting node responding to the communication to the transmitting node.

In yet an additional aspect, a computer program product provides for opportunistic data forwarding in a wireless network by comprising a computer-readable storage medium containing sets of codes. A first set of codes causes a computer to receive wireless communication from a transmitting node comprising packet data units (PDUs). A second set of codes causes the computer to determine a failure to receive a PDU. A third set of codes causes the computer to transmit a communication to the transmitting node indicating a failure to receive a PDU. A fourth set of codes causes the computer to receive the PDU from a supporting node responding to the communication to the transmitting node.

In yet another additional aspect, an apparatus provides for opportunistic data forwarding in a wireless network. Means are provided for receiving wireless communication from a transmitting node comprising packet data units (PDUs). Means are provided for determining a failure to receive a PDU. Means are provided for transmitting a communication to the transmitting node indicating a failure to receive a PDU. Means are provided for receiving the PDU from a supporting node responding to the communication to the transmitting node.

In yet a further aspect, an apparatus provides for opportunistic data forwarding in a wireless network. A receiver receives wireless communication from a transmitting node comprising packet data units (PDUs). A processor determines a failure to receive a PDU. A transmitter transmits a communication to the transmitting node indicating a failure to receive a PDU. The receiver receives the PDU from a supporting node responding to the communication to the transmitting node.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
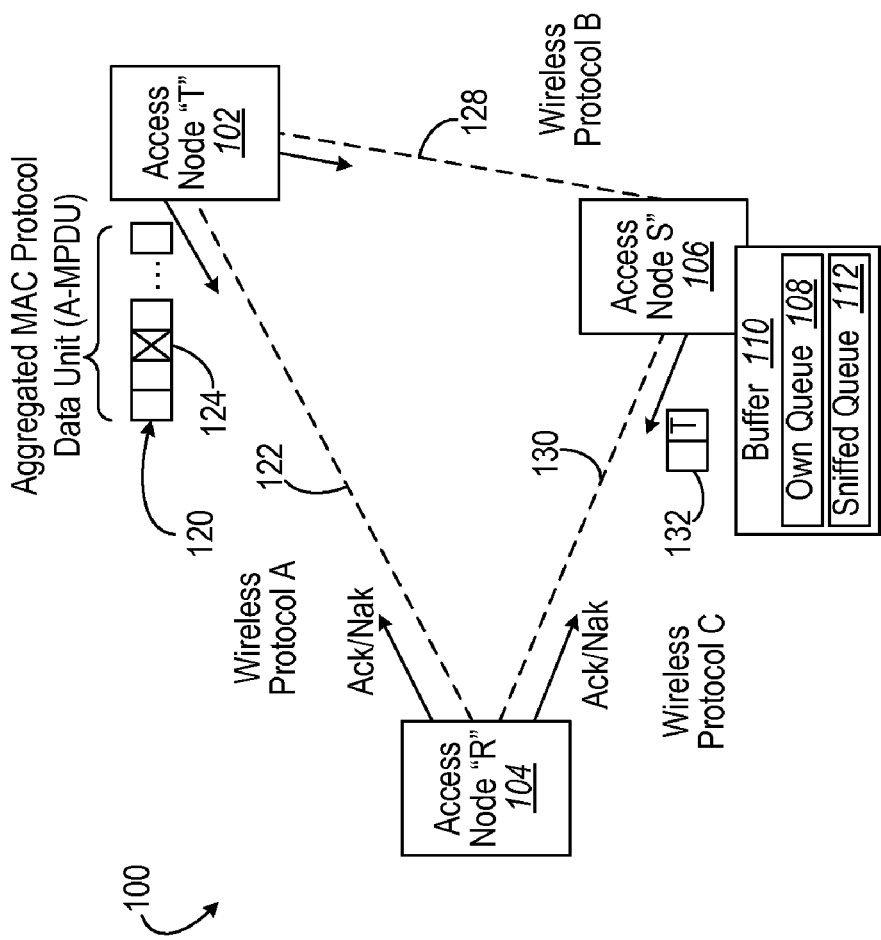
FIG. 1 illustrates a diagram of burst-oriented wireless communication channel for transmitting aggregated medium access channel protocol data units.

Opportunistic data forwarding and dynamic reconfiguration is achieved in a communication system, such as a wireless local area network (e.g., IEEE 802.11n) or in a radio access network, in order to more rapidly and efficiently respond to a changing channel state. In general, a node may have successfully received packets sent by one or more nodes in the vicinity to a given receiver, and is aware that these transmissions have failed. It forwards such previously failed packets in the remaining time available for it to transmit data to the receiver. If a significant number of packets are received through such data forwarding by an intermediate node, then the routing path can be modified to include this intermediate node. When the routing path is modified for a given flow, then the transmission opportunity time for the intermediate node is increased (or the number of transmission opportunities for the intermediate node is increased) to accommodate the new flow through the intermediate node.

The innovation is applicable to a number of short range wireless communication protocols such as IEEE 802.15.3 MAC/PHY (Ultrawideband), IEEE 802.15.4 MAC/PHY that supports sensor protocols such as Zigbee and 6LOWPAN, 802.11.x (WLAN-based) protocols, Bluetooth, and longer range protocols such as CDMA2000 (1xRTT, EV-DO, EV-DV, EV-DO RevB), GSM/GRPS/EGPRS, UMTS, HSDPA/HSUPA, HSPA-plus, UMB, WiMAX, or LTE), where such wireless protocols may be enhanced to allow an intermediate node to opportunistically forward failed packets. For purposes of illustration, we will use a WLAN-based protocol.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a server and the server can be a component. One or more components may reside within a process or thread of execution and a component may be localized on one computer or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more versions may be implemented as a method, apparatus, or article of manufacture using standard programming or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

Various aspects will be presented in terms of systems that may include a number of components, modules, and the like. It is to be understood and appreciated that the various systems may include additional components, modules, etc. or may not include all of the components, modules, etc. discussed in connection with the figures. A combination of these approaches may also be used. The various aspects disclosed herein can be performed on electrical devices including devices that utilize touch screen display technologies or mouse-and-keyboard type interfaces. Examples of such devices include computers (desktop and mobile), smart phones, personal digital assistants (PDAs), and other electronic devices both wired and wireless.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

With reference to FIG. 1, a wireless network 100 is formed between a transmitting node "T" 102 and a receiving node "R" 104 as detected by another node "S" 106 that volunteers to support the communication. In particular, in addition to capturing its own queue 108 in a buffer 110, the node S also maintains a sniffed queue 112 for neighboring nodes. Contents of the sniffed queue 112 can be routinely maintained in the event that an opportunity for data forward arising. Alternatively, such buffering can be initiated upon an initiating event, such as a request from node T 102 or node R 104. Alternatively, such buffering can be initiated when the node S 106 detects a previous incident of communication failure between nodes T & S 102, 104. Such buffering and opportunistic data forwarding can also be contingent upon available excess capacity by the node S 106. Consider that node T 102 needs to send some medium access channel (MAC) protocol data units (PDUs), that is MPDUs 120, to node R. Protocols such as 802.11n allow aggregated transmission of MPDUs. Due to a channel state of an air link 122 between the node T 102 and node R 104, a portion 124 of the A-MPDU 120 is not received by the node R 104, as almost immediately announced by the node R 104 that is robustly transmitted back over air link 122 to node T 102 as a Nak 126.

The node S 106 in the depicted scenario receives the A-MPDU 120 successfully over an air link 128 and has buffered them in the sniffed queue 112. When the node S 106 receives the Nak 126 over its air link 130 with the node R 104, the node S 106 is able to relay a tagged version 132 of the missing portion 124 to the access node R 102.

In one aspect, the transmitting node 102 can communicate over air link 122 with the receiving node 104 using a first wireless protocol "A". The supporting node 106 can sniff this communication using the first wireless protocol A, although the supporting node 106 communicates with the transmitting node 102 over airlink 128 using wireless protocol B. The supporting node 106 can communicate with the receiving node 104 with a wireless protocol C. Alternatively, two or three of the air links 122, 128, 130 can support communication via a common wireless protocol.

Figure 2:
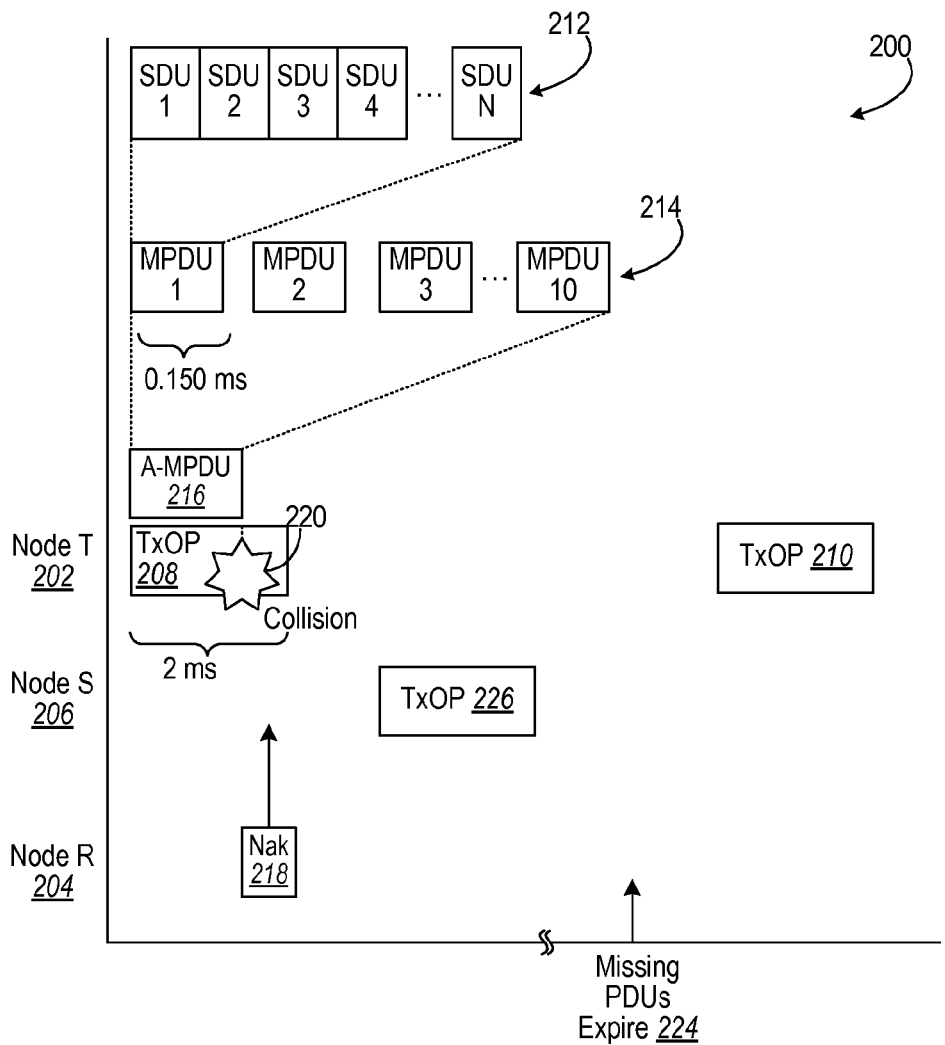
FIG. 2 illustrates a block diagram of a wireless communication system comprised of a transmitting node, a receiving node, and a supporting node performing opportunistic data forwarding.

In one illustrative aspect depicted in FIG. 2, an over-the-air (OTA) or wireless communication channel 200 is shared by a node T 202, node R 204, and node S 206. The node T 202 has burst TxOP (transmission opportunity) times 208, 210 to send data to another node R 204. In an illustrative scenario, the TxOPs 208, 210 are 2 ms in duration and are widely spaced to allow other nodes to access the communication channel 200. The medium access channel (MAC) of the node T 202 converts higher protocol service data units (SDUs) 212 into a plurality of MPDUs, depicted as ten MPDUs 214 of 150 μs each. If the node T 202 creates an A-MPDU 216 for ten MPDUs 214, then 1.5 ms of the available 2.0 ms of TxOP 208 are used.

The node R 204 would perform a check to see if the data was received successfully, which in the illustrative implementation entails a cyclic redundancy check (CRC) and an Ack or Nak 218 within 16 μs. Thus, if a collision or other interference 220 occurs as depicted, certain MPDUs could be prevented from being successfully transmitted. In particular, the block acknowledgement comes back indicating that some MPDU transmissions have failed the cyclic redundancy check (CRC) check, or the block acknowledgement itself fails. The flow is "bursty" with node T sending information to node R in bursts of MPDUs when it gets a transmission opportunity to send data to R. The MPDUs can be too late as depicted at 224 to be retransmitted when node T gets its next transmission opportunity to send data to R.

Advantageously, node S 206 in the vicinity of node T and R 202, 204 monitors transmissions from node T to node R 202, 204. The node S 206 also observes the block acknowledgement 218 from node R to node T 204, 202. The block acknowledgement 218 shows that transmission of one or more MPDU(s) 214 has failed. However, node S 206 has correctly received the MPDU(s) 214 after monitoring the transmission, and verifying that the CRC check has passed. When node S 206 has a transmission opportunity to transmit to node R, depicted as TxOP 226, if it has additional time available, it sends to R, these failed MPDU transmissions from node T to node R 202, 204 that it has successfully received. Node R 204 sends a block acknowledgement indicating to both nodes S and T 206, 202 of the MPDUs 214 that it has successfully received from node S 206. This obviates the need for node T 202 to retransmit failed MPDUs 214 to node R 204.

An example wireless network may include battery-operated computing and sensing devices (nodes) that collaborate to deliver sensed data, often over multiple hops. Nodes of the wireless network may communicate using any wireless protocol. For example IEEE 802.11b/g/n and/or Bluetooth may be used. IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Related documents may include, for example, IEEE 802.11a. IEEE 802.11n is an addition to the 802.11 family of standards that is intended to increase wireless network speed and reliability. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported.

Figure 3:
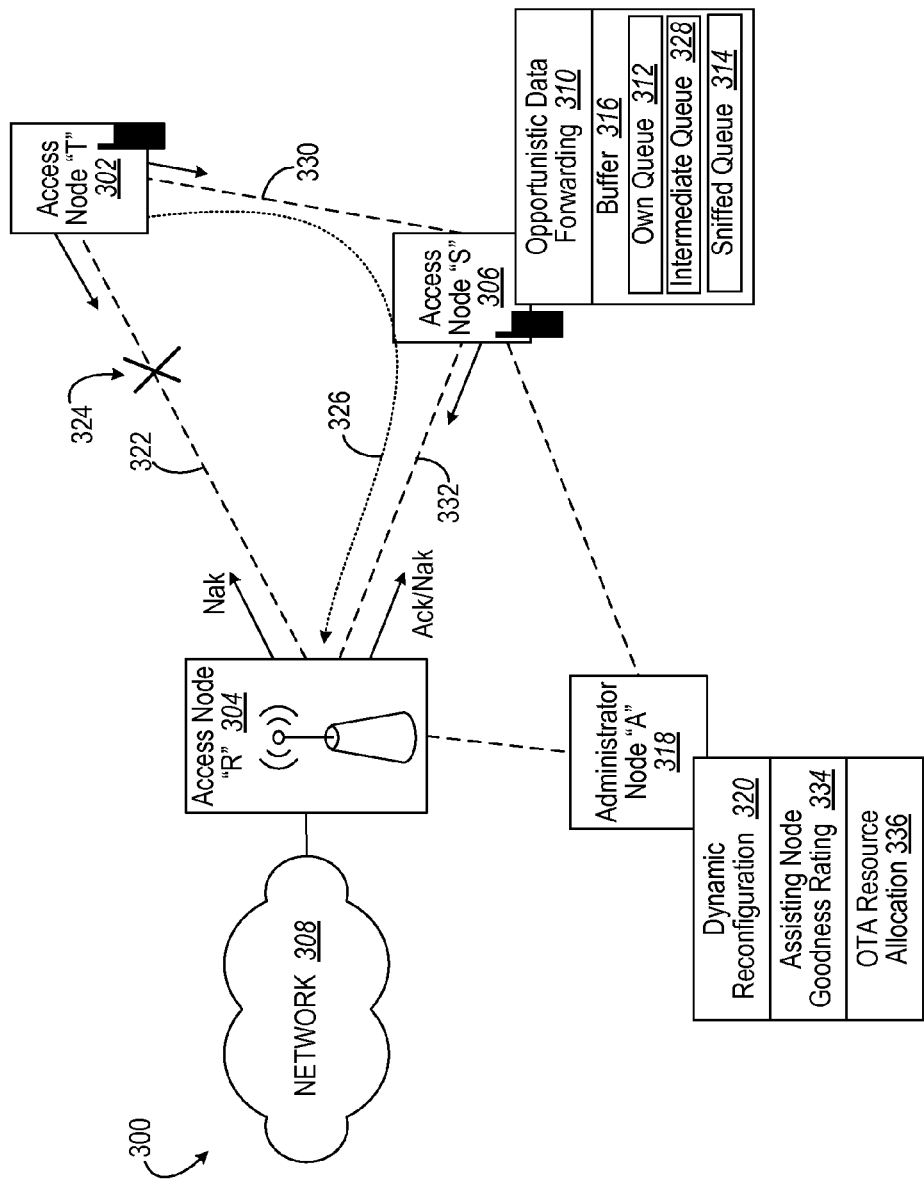
FIG. 3 illustrates a block diagram of a wireless communication system including a wireless local access network and a wired network that performs opportunistic data forwarding and dynamic reconfiguration.

In FIG. 3, in another aspect, a wireless network 300 has a transmitting terminal "T"01 depicted as an access node "T" 302 and a supporting access terminal "S" depicted as an access node "S" 306 within a wireless local access network (WLAN) coverage area 305 provided by a receiving node R depicted as an access point 304. The access point (node R) 304 also interfaces with a wired network 308, such as a public or private data packet network (e.g., Internet). The access node S 306 has an opportunistic data forwarding component 310 that utilizes an own queue 312 and sniffed queue 314 in a buffer 316 as described above with regard to FIGS. 1-2 to perform opportunistic data forwarding.

Advantageously, the access point 304 or another administrator node "A" 318 that is also in communication to the WLAN 305 include a dynamic reconfiguration component 320 that benefits from monitoring opportunistic data forwarding. Thus, when the channel state of air link 322 between the access node T 302 and the access point (node R) 304 fails as depicted at 324, then the administrator node A 318 can command entities within the WLAN 305 to set up a routing path 326 with the supporting node S 306 serving as intermediate node, setting up an intermediate queue 328. The administrator node A 318 benefits by a self-identified volunteer to assist the transmitting access node T 302, which implies sufficient capacity, available power, and having a suitable air link 330 with the node T 302 and a suitable air link 332 with the access point 304, thereby avoiding time-consuming overhead negotiations with various nodes to select an intermediate node.

The administrator node A 318 can further include an assisting node goodness rating component 334 that evaluates how helpful various nodes have been in performing opportunistic data forwarding. Such ratings can be disseminated by broadcast to nodes within the WLAN coverage area 305 to assist them in deciding whether to participate in opportunistic data forwarding. Favorable ratings can result in higher uplink allocations or other preferential treatment, such as managed and tracked by an over-the-air (OTA) resource allocation component 336.

Alternatively or in addition, the supporting node S 306 can recognize that more than opportunistic data forwarding is called for and initiate setting up a multi-hop routing path.

Figure 4:
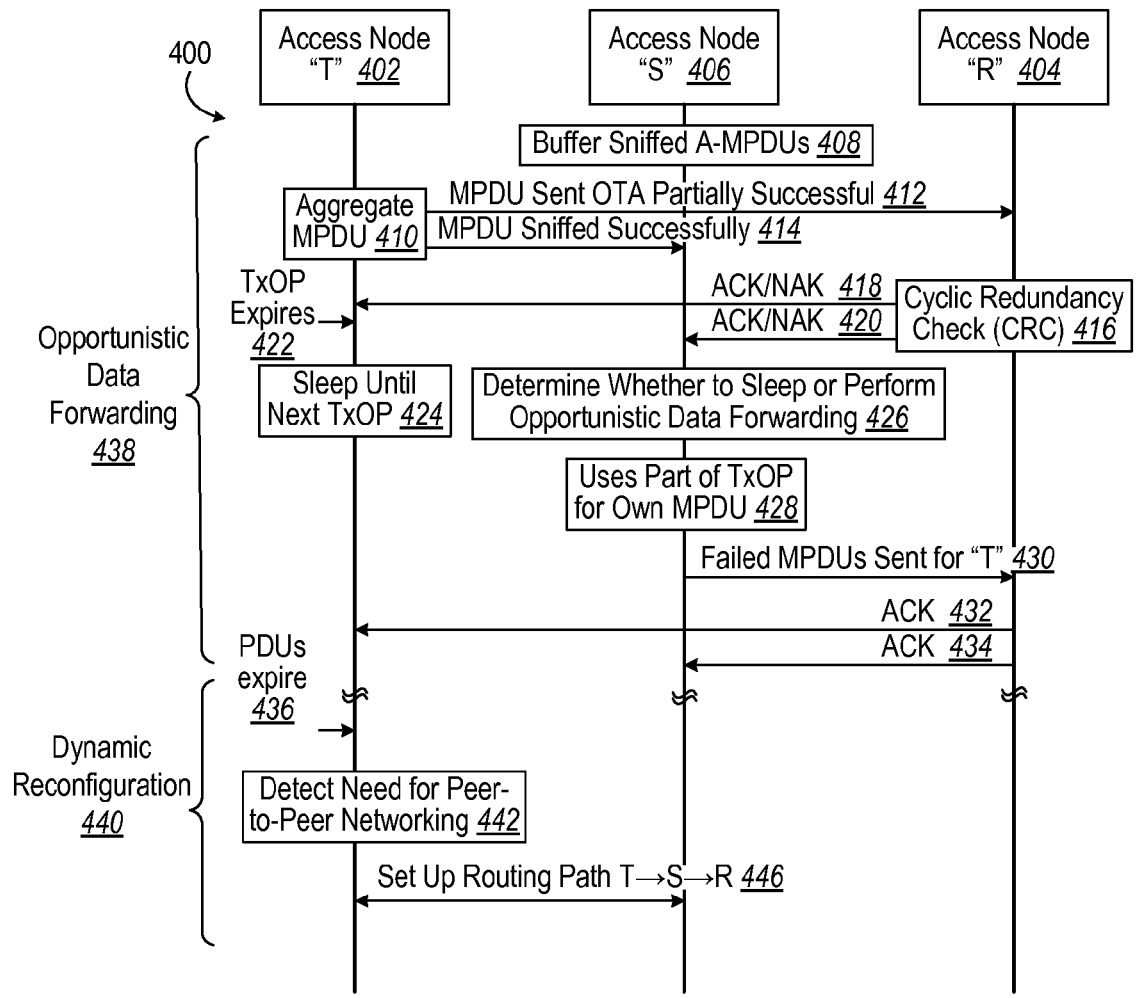
FIG. 4 illustrates a timing diagram of communications by the wireless communication system of FIG. 3.

In an illustrative aspect depicted in FIG. 4, a methodology 400 for opportunistic data forwarding and dynamic reconfiguration is performed by a burst-oriented wireless network 402. In particular, consider a wireless communication system in which medium access control (MAC) contention protocols are relied upon to compete for uplink resources. Transmission opportunities (TxOP) 102 are constrained with significant delays imposed between subsequent TxOPs 102 to give other wireless nodes access to the channel. Certain large format data protocols, such as aggregated MAC protocol data units (A-MPDUs) can largely exhaust available TxOP. Robust error correction coding may be inappropriate, especially for certain media forms like Voice over IP (VoIP), streaming video, digital images, etc., that are already large consumers of OTA resources. Yet, failure to successfully transmit each PDU of the A-MPDU can reduce quality of service with degraded audio/video playback as failed PDUs can expire In FIG. 4, a methodology 400 performs opportunistic data forwarding and dynamic reconfiguration within a wireless network depicted as a transmitting access node "T" 402, a receiving access node "R" 404, and a proximally positioned supporting access node "S" 406. In block 408, the supporting access node S 406 is buffering sniffed A-MPDUs, which can be a routinely performed in order to identify communications pertinent to the node 406. The node S 406 can buffer for a longer period in order to determine if any are needed for opportunistic data forwarding. Buffering can be more targeted, such as singled out for nodes detected as having difficulty communicating or after having been requested. Buffering can also be dependent upon available resources (e.g., data throughput, memory, power, computing capacity, etc.).

The transmitting access node T 402 aggregates MPDUs in block 410, sending to receiving node R 404, which is only partially successful as depicted at 412. The supporting node S 406 successfully overhears or sniffs the A-MPDU as depicted at 414. The receiving node R 404 performs a check, depicted as a cyclic redundancy check (CRC) in block 416, although other checks can be performs alternatively or in addition to determine what portions of the transmission failed. The receiving access node R 404 communicates the successes and failures of transmission, depicted as Ack/Nak at 418 to the transmitting access node 402, which is overheard/sniffed by the supporting access node S 406 as depicted at 420. The TxOP for the transmitting access node T 402 expires as depicted at 422 before retransmission can occur, so the transmitting access node T 402 sleeps until the next TxOP (block 424).

The supporting access node S 406 in block 426 can determine whether or not to perform opportunistic data forwarding. Various factors can be weighted in making this determination, such as whether or not the failed PDUs are time critical, whether or not channel state is such that the transmitting access node 402 will have another opportunity to retransmit in time. Another factor can be the availability of resources of the supporting access node S 406 (e.g., battery power, buffer, computing power, own transmission allocations and queued data, etc.). If participating, then the missing PDU(s) are tagged and included in the burst transmission by the supporting access node S 406 (block 428), which is sent to the receiving access node R 404 as depicted at 430, which in turn responds with an Ack to the transmitting access node T 432 and to the supporting access node S 406 as depicted at 434. Thus, the whole A-MPDU has been successfully received by the receiving access node R 404 before the PDUs expire as depicted at 436 that occurs before the transmitting access node 402 has another TxOP to retransmit. Thus, the portion 438 of the methodology 400 for opportunistic data forwarding concludes.

A dynamic reconfiguration portion 440 of the methodology 400 can benefit from monitoring the opportunistic data forwarding portion 438. If node S 404 observes that a significant number of MPDUs have failed from node T 402 to node R 404, and if node T 402 observes that the node S 406 is successful in transmitted such MPDUs to node R 404 based on the acknowledgement from node R 404, then node T 402 dynamically can elects to use a multi-hop path (block 442) to route MPDUs to node R 404 via node S 406 as depicted at 444.

Figure 5:
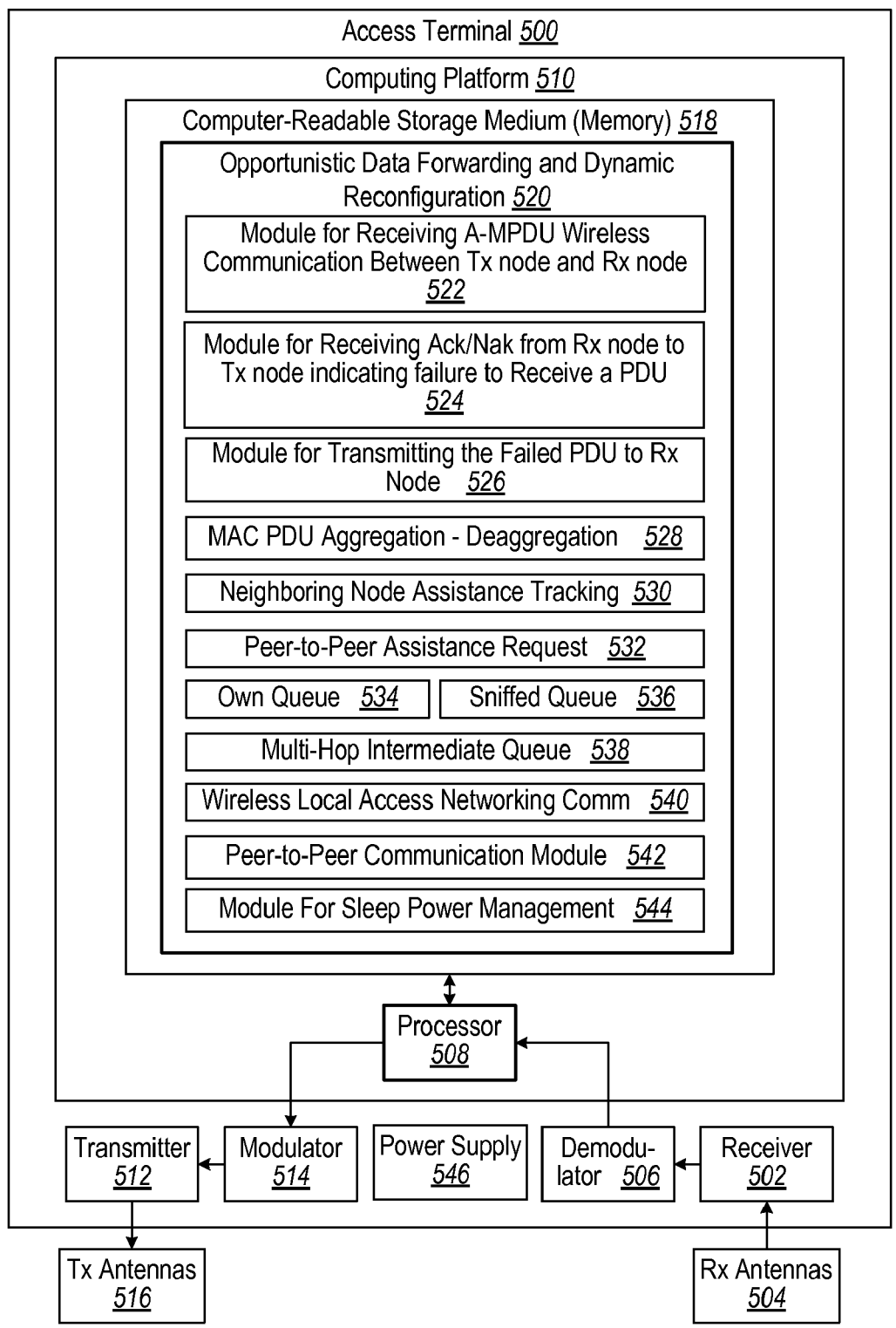
FIG. 5 illustrates a block diagram of an access terminal that can perform opportunistic data forwarding for the wireless communication systems of FIGS. 2 and 4.

In FIG. 5, in another aspect, an access node, depicted as an access terminal 500, includes modules that provide a means to cause a computer to manage opportunistic data forwarding in a wireless network. Access terminal 500 comprises a receiver 502 that receives a signal from, for instance, a receive antenna 504, and performs typical actions thereon (e.g., filters, amplifies, downconverts, etc.) the received signal and digitizes the conditioned signal to obtain samples. Receiver 502 can be operatively associated with a demodulator 506 that demodulates received signals and provides them to a processor 508 for channel estimation. Processor 508 may be a processor dedicated to analyzing information received by receiver 502 and/or generating information for transmission by a transmitter 510, a processor that is part of a computing platform 510 that controls one or more components of access terminal 500, and/or a processor that both analyzes information received by receiver 502, generates information for transmission by transmitter 512, and controls one or more components of access terminal 500. The processor 508 sends signals to a modulator 514 for filtering, amplification, upconverts, modulation, etc., then to the transmitter 512 for transmitting over a transmitter (Tx) antenna 516.

Additionally, processor 508 may execute instructions contained in a computer-readable storage medium (memory) 518 that comprises opportunistic data forwarding and dynamic reconfiguration (ODFDR) component 520 and that may store data to be transmitted, received data, and the like. It will be appreciated that the data store (e.g., memory 518) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 518 of the subject systems and methods is intended to comprise, without being limited to, these and any other suitable types of memory.

The ODFDR component 520 has a module 522 that provides a means for receiving wireless communication between a transmitting node and a receiving node comprising packet data units (PDUs), depicted as a module 518. The ODFDR component 520 has a module 524 that provides means for receiving a communication at a supporting node from the receiving node to the transmitting node indicating a failure to receive a PDU. The ODFDR component 520 has a module 526 that provides a means for transmitting the PDU that was indicated to have failed to the receiving node from the supporting node.

In one aspect, the access terminal 500 is capable of aggregating and deaggregating MAC PDUs by a module 528. A module 530 tracks neighboring nodes that assist others by performing opportunistic data forwarding. A module 532 is detects when it is necessary or desirable to performing peer-to-peer communication protocol in order to set up or respond to requests for acting as an intermediate node based in part upon the tracking by module 530. An own queue 534 buffers data that is to be transmitted. A sniffed queue 536 retains data packets overheard from other nodes. A multi-hop intermediate queue 538 supports acting as an intermediate node. A wireless local access networking communication module 540 supports wireless communication protocols for communicating with an access point. A peer-to-peer communication module 542 supports the protocols necessary for peer-to-peer communication. A module 544 manages sleeping states for the access terminal 500 to extend service life of power supply 546 for portable applications.

Figure 6:
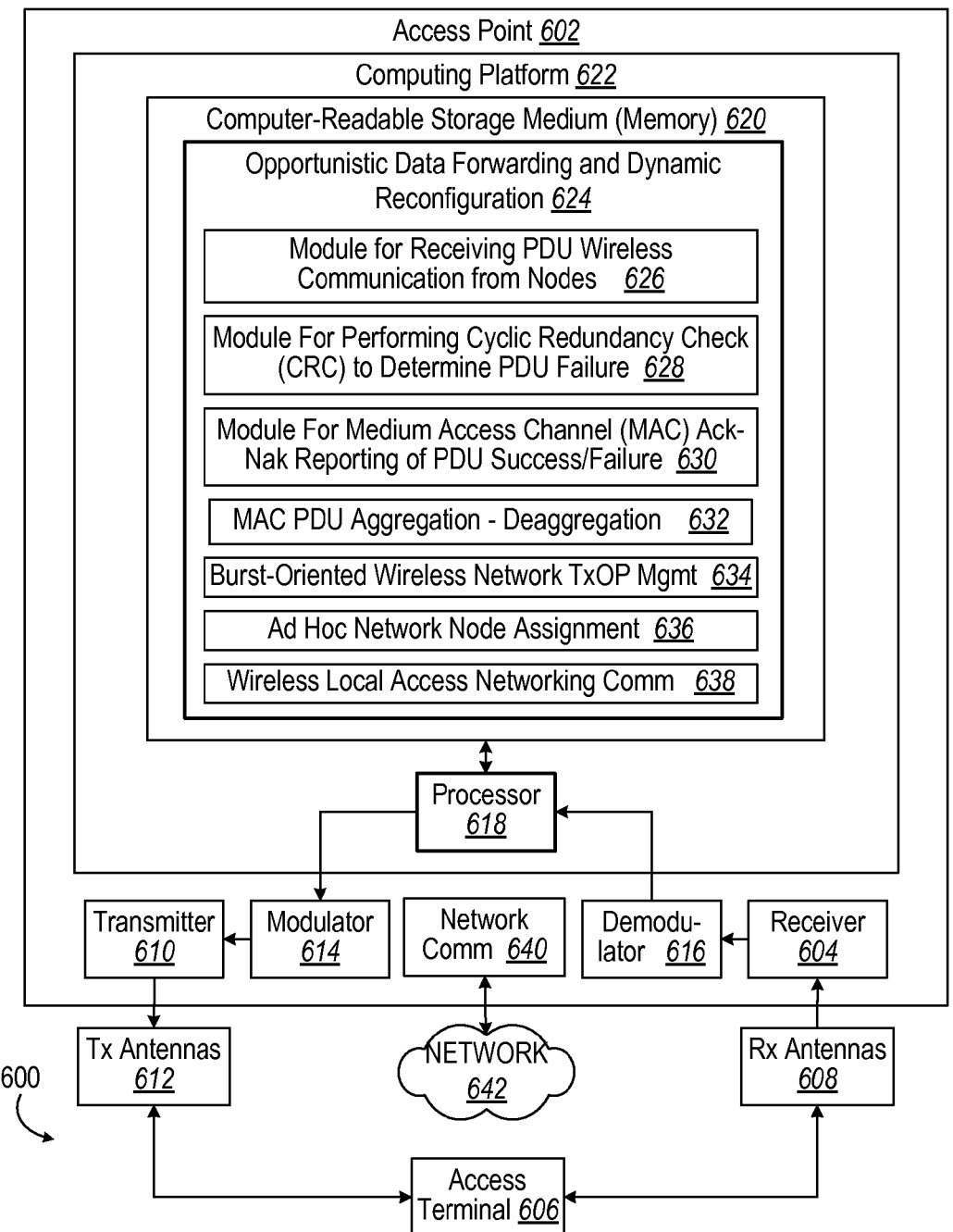
FIG. 6 illustrates a block diagram of an access point that can manage opportunistic data forwarding and dynamic reconfiguration for the wireless local access network of FIG. 4.

FIG. 6 is an illustration of a system 600 that facilitates opportunistic data forwarding and dynamic reconfiguration. System 600 comprises an access point 602 with a receiver 604 that receives signal(s) from one or more access terminals 606 through a plurality of receive antennas 608, and a transmitter 610 that transmits to the one or more access terminals 606 through one or more transmit antennas 612 as modulated by a modulator 614. Receiver 604 can receive information from receive antennas 608 and is operatively associated with a demodulator 616 that demodulates received information. Demodulated symbols are analyzed by a processor 618 that may be similar to the processor described above with regard to FIG. 5, and which is coupled to a memory 620 to form a computing platform 622 that stores information related to and instructions contained in an opportunistic data forwarding and dynamic reconfiguration (ODFDR) component 624, and any other suitable information related to performing the various actions and functions set forth herein.

The ODFDR component 624 can comprise a module 626 that provides a means for receiving wireless communication from a transmitting node comprising packet data units (PDUs) and means for receiving the PDU from a supporting node responding to the communication to the transmitting node. The ODFDR component 624 can comprise a module 628 that provides a means for determining a failure to receive a PDU. The ODFDR component 624 can comprise a module 630 that provides a means for transmitting a communication to the transmitting node indicating a failure to receive a PDU. The ODFDR component 624 can also comprise a module 632 for aggregating/deaggregating MPDUs, a module 634 for managing a wireless network that utilizes allocations or protocols for burst transmission opportunities TxOp, a module 636 for ad hoc network intermediate node assignments, and a module 638 for wireless local access networking communication. A network communication module 640 under control of the processor 618 can interface to a wired network 642.

Aspects disclosed herein have application to various types of wireless communication systems. In particular, it should be appreciated that wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, and orthogonal frequency division multiple access (OFDMA) systems.

Example wireless networks include cellular-based data systems. The following are several such examples: (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems"

(the IS-2000 standard), and (4) the high data rate (HDR) system that conforms to the TIA/EIA/IS-856 standard (the IS-856 standard).

Other examples of wireless systems include Wireless Local Area Networks (WLANs) such as the IEEE 802.11 standards (i.e. 802.11 (a), (b), or (g)). Improvements over these networks may be achieved in deploying a Multiple Input Multiple Output (MIMO) WLAN comprising Orthogonal Frequency Division Multiplexing (OFDM) modulation techniques. IEEE 802.11(e) has been introduced to improve upon some of the shortcomings of previous 802.11 standards.

IEEE 802.11n is a proposed amendment to the IEEE 802.11-2007 wireless networking standard to significantly improve network throughput over previous standards, such as 802.11b and 802.11g, with a significant increase in raw (PHY) data rate from 54 Mbit/s to a maximum of 600 Mbit/s. Most devices today support a PHY rate of 300 Mbit/s, with the use of 2 Spatial Streams at 40 MHz. Depending on the environment, this may translate into a user throughput (TCP/IP) of 100 Mbit/s. IEEE 802.11n builds on previous 802.11 standards by adding multiple-input multiple-output (MIMO) and Channel-bonding/40 MHz operation to the physical (PHY) layer, and frame aggregation to the MAC layer.

MIMO uses multiple transmitter and receiver antennas to improve the system performance. MIMO is a technology which uses multiple antennas to coherently resolve more information than possible using a single antenna. Two important benefits it provides to 802.11n are antenna diversity and spatial multiplexing. MIMO technology relies on multipath signals. Multipath signals are the reflected signals arriving at the receiver some time after the line of sight (LOS) signal transmission has been received. In a non-MIMO based 802.11a/b/g network, multipath signals were perceived as interference degrading a receiver's ability to recover the message information in the signal. MIMO uses the multipath signal's diversity to increase a receiver's ability to recover the message information from the signal.

Another ability MIMO technology provides is Spatial Division Multiplexing (SDM). SDM spatially multiplexes multiple independent data streams, transferred simultaneously within one spectral channel of bandwidth. MIMO SDM can significantly increase data throughput as the number of resolved spatial data streams is increased. Each spatial stream requires a discrete antenna at both the transmitter and the receiver. In addition, MIMO technology requires a separate radio frequency chain and analog-to-digital converter for each MIMO antenna which translates to higher implementation costs compared to non-MIMO systems.

Channel Bonding, also known as 40 MHz, is a second technology incorporated into 802.11n which can simultaneously use two separate non-overlapping channels to transmit data. Channel bonding increases the amount of data that can be transmitted. 40 MHz mode of operation uses 2 adjacent 20 MHz bands. This allows direct doubling of the PHY data rate from a single 20 MHz channel. (Note however that the MAC and user level throughput will not double.) Coupling MIMO architecture with wider bandwidth channels offers the opportunity of creating very powerful yet cost-effective approaches for increasing the physical transfer rate.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Figure 7:
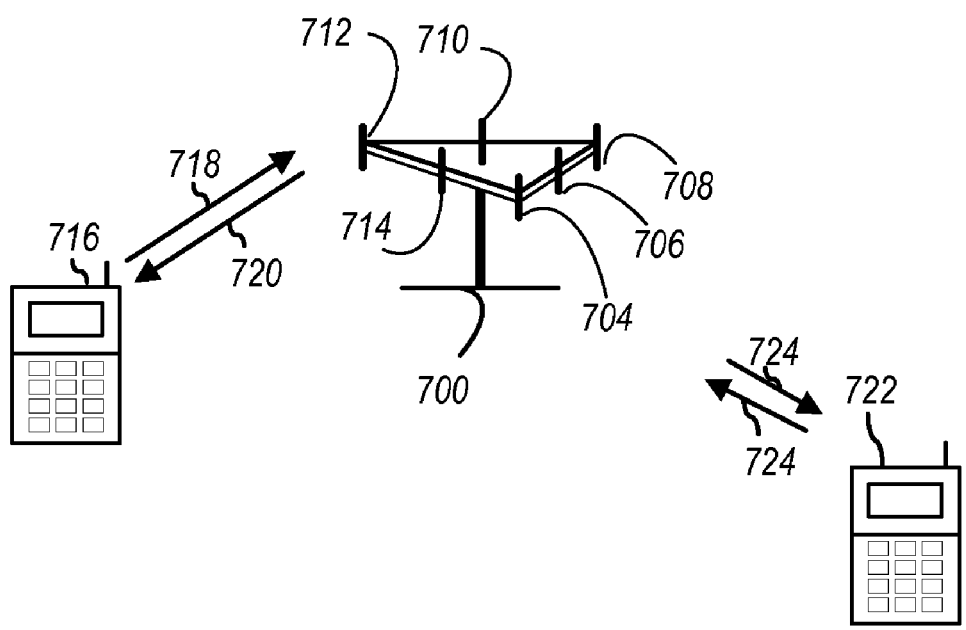
FIG. 7 illustrates a block diagram of a communication system enhanced to support opportunistic data forwarding and dynamic reconfiguration in a radio access network.

Referring to FIG. 7, a multiple access wireless communication system according to one aspect is illustrated. An access point 700 (AP) includes multiple antenna groups, one including 704 and 706, another including 708 and 710, and an additional including 712 and 714. In FIG. 3, only two antennas are shown for each antenna group, however, more or fewer antennas may be utilized for each antenna group. Access terminal 716 (AT) is in communication with antennas 712 and 714, where antennas 712 and 714 transmit information to access terminal 716 over forward link 720 and receive information from access terminal 716 over reverse link 718. Access terminal 722 is in communication with antennas 706 and 708, where antennas 706 and 708 transmit information to access terminal 722 over forward link 726 and receive information from access terminal 722 over reverse link 724. In a FDD system, communication links 718, 720, 724 and 726 may use different frequency for communication. For example, forward link 720 may use a different frequency then that used by reverse link 718.

Each group of antennas or the area in which they are designed to communicate is often referred to as a sector of the access point. In the aspect, antenna groups each are designed to communicate to access terminals in a sector, of the areas covered by access point 700.

In communication over forward links 720 and 726, the transmitting antennas of access point 700 utilize beamforming in order to improve the signal-to-noise ratio of forward links for the different access terminals 716 and 724. In addition, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 8:
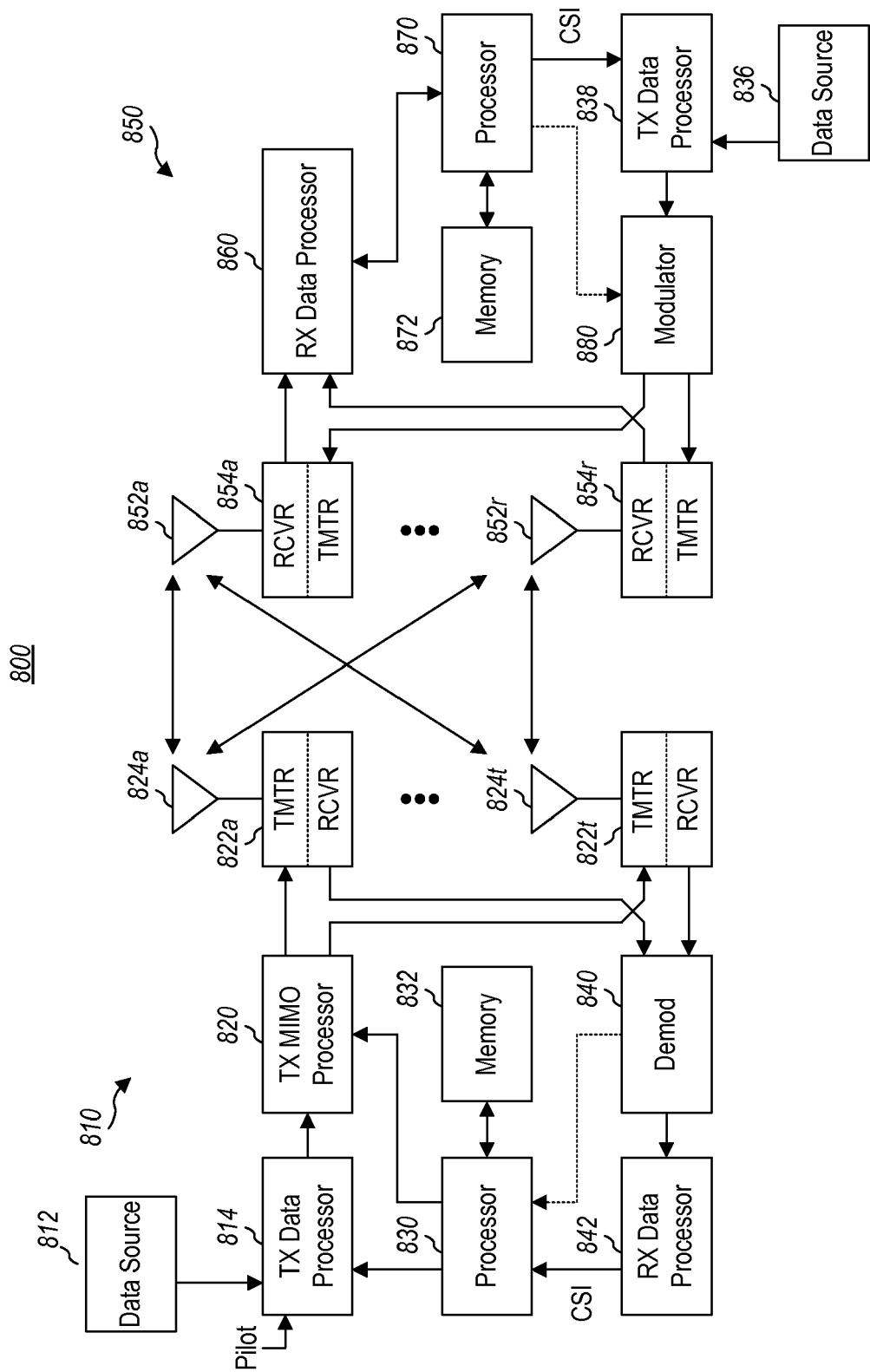
FIG. 8 illustrates a diagram of a multiple access wireless communication system according to one aspect for opportunistic data forwarding and dynamic reconfiguration.

FIG. 8 is a block diagram of an aspect of a transmitter system 810 (also known as the access point) and a receiver system 850 (also known as access terminal) in a MIMO system 800. At the transmitter system 810, traffic data for a number of data streams is provided from a data source 812 to a transmit (TX) data processor 814.

In an aspect, each data stream is transmitted over a respective transmit antenna. TX data processor 814 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 830.

The modulation symbols for all data streams are then provided to a TX MIMO processor 820, which may further process the modulation symbols (e.g., for OFDM). TX MIMO processor 820 then provides $N_T$ modulation symbol streams to $N_T$ transmitters (TMTR) 822a through 822t. In certain implementations, TX MIMO processor 820 applies beamforming weights to the symbols of the data streams and to the antenna from which the symbol is being transmitted.

Each transmitter 822 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 822a through 822t are then transmitted from $N_T$ antennas 824a through 824t, respectively.

At receiver system 850, the transmitted modulated signals are received by $N_R$ antennas 852a through 852r and the received signal from each antenna 852 is provided to a respective receiver (RCVR) 854a through 854r. Each receiver 854 conditions (e.g., filters, amplifies, and downconverts) a respective received signal, digitizes the conditioned signal to provide samples, and further processes the samples to provide a corresponding "received" symbol stream.

An RX data processor 860 then receives and processes the NR received symbol streams from $N_R$ receivers 854 based on a particular receiver processing technique to provide $N_T$ "detected" symbol streams. The RX data processor 860 then demodulates, deinterleaves, and decodes each detected symbol stream to recover the traffic data for the data stream. The processing by RX data processor 860 is complementary to that performed by TX MIMO processor 820 and TX data processor 814 at transmitter system 810.

A processor 870 periodically determines which pre-coding matrix to use (discussed below). Processor 870 formulates a reverse link message comprising a matrix index portion and a rank value portion.

The reverse link message may comprise various types of information regarding the communication link or the received data stream. The reverse link message is then processed by a TX data processor 838, which also receives traffic data for a number of data streams from a data source 836, modulated by a modulator 880, conditioned by transmitters 854a through 854r, and transmitted back to transmitter system 810.

At transmitter system 810, the modulated signals from receiver system 850 are received by antennas 824, conditioned by receivers 822, demodulated by a demodulator 840, and processed by a RX data processor 842 to extract the reserve link message transmitted by the receiver system 850. Processor 830 then determines which pre-coding matrix to use for determining the beamforming weights then processes the extracted message.

In an aspect, logical channels are classified into Control Channels and Traffic Channels. Logical Control Channels comprises Broadcast Control Channel (BCCH), which is DL channel for broadcasting system control information. Paging Control Channel (PCCH), which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In one aspect, Logical Traffic Channels can comprise a Dedicated Traffic Channel (DTCH), which is Point-to-point bi-directional channel, dedicated to one UE, for the transfer of user information. In addition, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprise a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and Load Indicator Channel (LICH).

The UL PHY Channels comprises Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and Broadband Pilot Channel (BPICH).

The Primary SCH enables synchronization of chip, slot, and symbol and is comprised of 256 chips that are the same in all cells. The secondary SCH provides frame synchronization and code group (i.e., one of 64) and is a 15-code sequence of secondary synchronization codes. There are 64 S-SCH sequences corresponding to the 64 scrambling code groups. The 256 chips are different for different cells and slot intervals. The CPICH is one of eight scrambling codes used to find the primary scrambling code. The PCCPCH (Primary Common Control Physical Channel) is for super frame synchronization and BCCH information that is a fixed 30 kbps channel at a 27 kbps rate with a spreading factor 256. The SCCPCH (Secondary Common Control Physical Channel) carries FACH and PCH channels at a variable bit rate.

Figure 9:
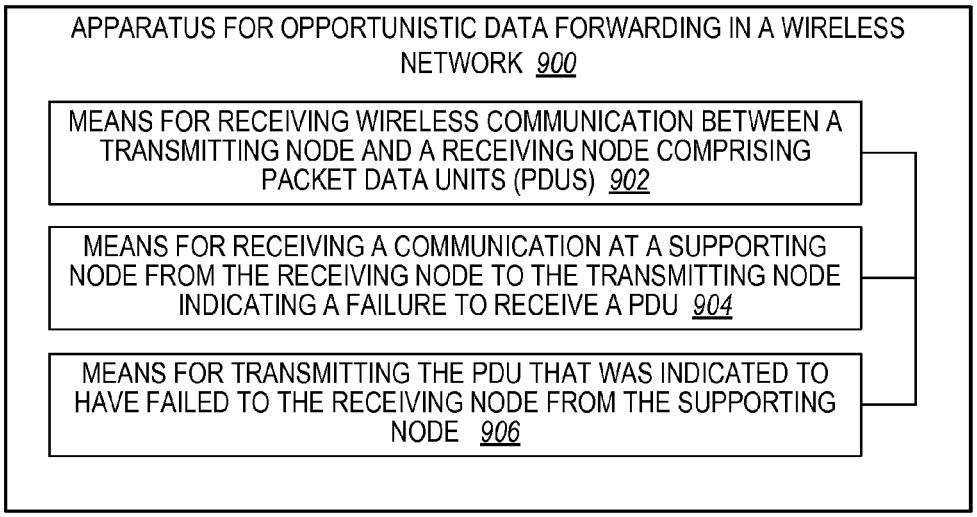
FIG. 9 illustrates a block diagram of an opportunistic data forwarding apparatus.

In FIG. 9, an apparatus 900 provides for opportunistic data forwarding in a wireless network by comprising means 902 for receiving wireless communication between a transmitting node and a receiving node comprising packet data units (PDUs). Means 904 are provided for receiving a communication at a supporting node from the receiving node to the transmitting node indicating a failure to receive a PDU.

Means 906 are provided for transmitting the PDU that was indicated to have failed to the receiving node from the supporting node.

Figure 10:
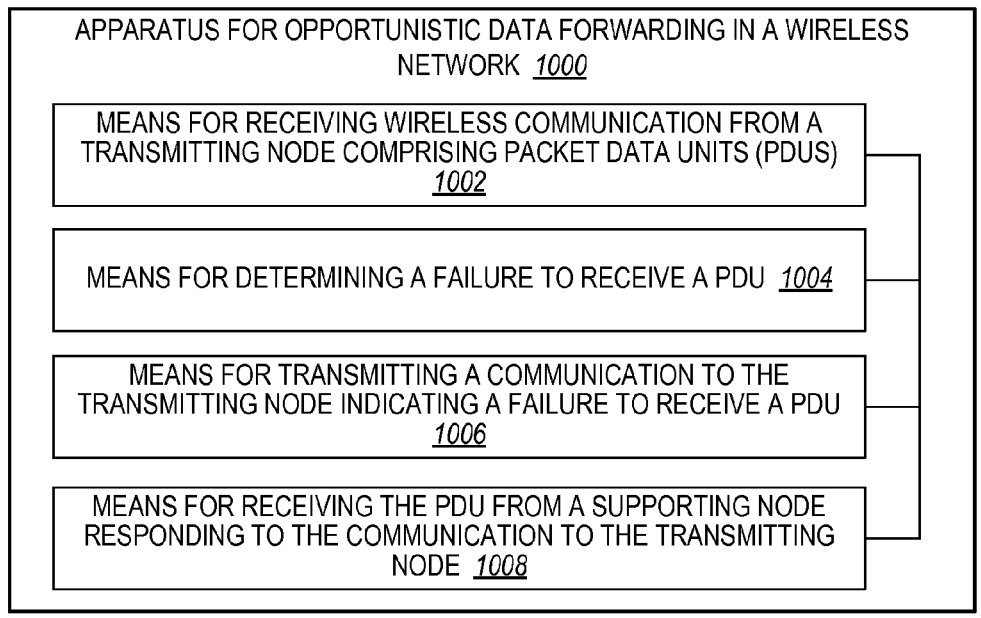
FIG. 10 illustrates a block diagram of an opportunistic data forwarding apparatus.

In FIG. 10, an apparatus 1000 provides for opportunistic data forwarding in a wireless network by comprising means 1002 for receiving wireless communication from a transmitting node comprising packet data units (PDUs). Means 1004 are provided for determining a failure to receive a PDU. Means 1006 are provided for transmitting a communication to the transmitting node indicating a failure to receive a PDU. Means 1008 are provided for receiving the PDU from a supporting node responding to the communication to the transmitting node.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description of the claims is meant to be a "non-exclusive or".

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, opportunistic data forwarding can be trained to recognize data communications that require assistance in order to avoid expiration and reduction in quality of service. In addition, a particular node can recognize which node is best situated to serve as supporting node. In another example, an access point or administrator node can optimize detection of a situation warranting setting up an intermediate node in a multi-hop path and optimize selection of the best situated node.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for opportunistic data forwarding in a wireless network, comprising:
   receiving a first communication between a transmitting node and a receiving node comprising packet data units (PDUs);
   receiving a second communication at a supporting node from the receiving node to the transmitting node indicating a failure to receive a PDU;
   determining that the transmitting node has exhausted a transmission opportunity time in a burst-oriented wireless communication protocol; and
   transmitting the PDU that was indicated to have failed to the receiving node from the supporting node in response to determining to have unused transmit time for the supporting node during a subsequent transmission opportunity time for the supporting node, wherein the supporting node comprises a sniffed queue and an own queue, and wherein the PDU that was indicated to have failed is transmitted from the sniffed queue of the supporting node.

2. The method of claim 1, further comprising aggregating and deaggregating PDUs packaged as medium access channel (MAC) PDUs.

3. An apparatus for opportunistic data forwarding in a wireless network, comprising:
   a receiver for receiving a first communication between a transmitting node and a receiving node comprising packet data units (PDUs), and for receiving a second communication at a supporting node from the receiving node to the transmitting node indicating a failure to receive a PDU;
   an opportunistic data forwarding component for determining that the transmitting node has exhausted a transmission opportunity time in a burst-oriented wireless communication protocol; and a transmitter for transmitting the PDU that was indicated to have failed to the receiving node, wherein the supporting node comprises a sniffed queue and an own queue, and wherein the PDU that was indicated to have failed is transmitted from the sniffed queue of the supporting node, wherein the transmitter transmits the PDU that was indicated to have failed to the receiving node in response to determining to have unused transmit time for the supporting node during a subsequent transmission opportunity time for the supporting node.

4. The apparatus of claim 3, wherein the opportunistic data forwarding component aggregates and deaggregates PDUs packaged as medium access channel (MAC) PDUs.

5. An apparatus for opportunistic data forwarding in a wireless network, comprising:
  means for receiving a first communication between a transmitting node and a receiving node comprising packet data units (PDUs);
  means for receiving a second communication at a supporting node from the receiving node to the transmitting node indicating a failure to receive a PDU;
  means for determining that the transmitting node has exhausted a transmission opportunity time in a burst-oriented wireless communication protocol; and
  means for transmitting the PDU that was indicated to have failed to the receiving node from the supporting node in response to determining to have unused transmit time for the supporting node during a subsequent transmission opportunity time for the supporting node, wherein the supporting node comprises a sniffed queue and an own queue, and wherein the PDU that was indicated to have failed is transmitted from the sniffed queue of the supporting node.

6. The apparatus of claim 5, further comprising means for aggregating and deaggregating PDUs packaged as medium access channel (MAC) PDUs.

7. A non-transitory computer readable medium comprising:
  code for causing at least one computer to receive a first communication between a transmitting node and a receiving node comprising packet data units (PDUs);
  code for causing at least one computer to receive a second communication at a supporting node from the receiving node to the transmitting node indicating a failure to receive a PDU;
  code for causing at least one computer to determine that the transmitting node has exhausted a transmission opportunity time in a burst-oriented wireless communication protocol;
  and
  code for causing at least one computer to transmit the PDU that was indicated to have failed to the receiving node from the supporting node in response to determining to have unused transmit time for the supporting node during a subsequent transmission opportunity time for the supporting node, wherein the supporting node comprises a sniffed queue and an own queue, and wherein the PDU that was indicated to have failed is transmitted from the sniffed queue of the supporting node.

8. The computer readable medium of claim 7, further comprising code for causing at least one computer to aggregate and deaggregate PDUs packaged as medium access channel (MAC) PDUs.

\* \* \* \* \*